United States Patent [19]
Zwahlen

[11] 3,961,965
[45] *June 8, 1976

[54] DYESTUFF PREPARATIONS AND PRINTING INKS

[75] Inventor: Guenther Zwahlen, Dornach, Switzerland

[73] Assignee: Sublistatic Holding SA, Switzerland

[ * ] Notice: The portion of the term of this patent subsequent to Dec. 17, 1991, has been disclaimed.

[22] Filed: July 18, 1974

[21] Appl. No.: 489,826

Related U.S. Application Data

[60] Division of Ser. No. 354,978, April 27, 1973, Pat. No. 3,854,969, which is a continuation of Ser. No. 99,678, Dec. 8, 1970, abandoned, which is a continuation-in-part of Ser. No. 743,287, July 9, 1968, abandoned.

[30] Foreign Application Priority Data

July 24, 1967   Switzerland...................... 10436/67
Nov. 2, 1967   Switzerland...................... 15343/67

[52] U.S. Cl.................................. 106/22; 106/26; 106/176; 106/193 D
[51] Int. Cl.$^2$......................................... C09D 11/14
[58] Field of Search ................ 106/22, 23, 176, 26, 106/193 D; 117/36.1; 8/2.5; 101/470; 260/286, 289, 163

[56] References Cited
UNITED STATES PATENTS

| | | | |
|---|---|---|---|
| 1,828,599 | 10/1931 | De Montmollin.................... | 260/163 |
| 3,280,735 | 10/1966 | Clark et al.............................. | 8/2.5 |
| 3,363,557 | 1/1968 | Blake..................................... | 101/470 |
| 3,632,291 | 2/1969 | Riehen et al......................... | 117/36.1 |
| 3,854,969 | 12/1974 | Zwahlen .......................... | 106/193 D |

FOREIGN PATENTS OR APPLICATIONS

1,221,126   2/1971   United Kingdom

OTHER PUBLICATIONS

Condensed Chemical Dictionary, 1961, p. 648.

*Primary Examiner*—Theodore Morris
*Attorney, Agent, or Firm*—Wenderoth, Lind & Ponack

[57] ABSTRACT

The invention relates to a dyestuff preparation containing
1. at least one dyestuff and/or fluorescent brightening agent which sublimes at 100° to 300°C and
2. at least one resin soluble in organic solvents.

10 Claims, No Drawings

DYESTUFF PREPARATIONS AND PRINTING INKS

CROSS-REFERENCES TO RELATED APPLICATION

This is a division of application Ser. No. 354,970, filed Apr. 27, 1973, now U.S. Pat. No. 3,854,969, which is in turn a continuation of Ser. No. 99,678, now abandoned, filed Dec. 18, 1970 which in turn is a continuation-in-part of Ser. No. 743,287, now abandoned, filed July 9, 1968.

The present invention provides new printing inks, a process for their manufacture and the new dyestuff preparations required for their manufacture which are soluble and/or very finely dispersible in organic solvents and/or water.

The printing inks of the invention are used for the preparation of preferably non-textile, flat-surfaced materials bearing sublimable and/or migratory dyestuffs as used in the so-called transfer or sublimation printing process, which is described, for example, in British Patent Specification Nos. 349,683 and 1,052,625 and in French Patent Specification No. 1,223,330.

The dyestuff preparations of the invention, which serve as basis for the printing inks of the invention, differ from the dyestuff preparations known hitherto in that the dyestuffs used are suitable for the above-mentioned transfer or sublimation printing process. The dyestuff preparations that have hitherto been used in the manufacture of printing inks used, for example, for printing packaging materials or coloured illustrated magazines contain high-quality inorganic and/or organic colorants which are distinguished by the fact that they display the smallest possible degree of solubility in water and/or organic solvents and also the best possible fastness to migration and sublimation. Insoluble and non-subliming colorants of this kind are generally known as pigments. By contrast, the dyestuff preparations of the invention do not contain such pigments, but dyestuffs which, unlike pigments, migrate and/or sublime to a high degree at relatively low temperatures, for example, at temperatures within the range of from about 140°C to 250°C.

The invention thus provides printing inks which contain 1. at least one dyestuff which sublimes at 100° to 300°C, preferably at 160° to 220°C,
2. at least one soluble resin which serves as dyestuff support,
3. at least one aqueous organic solvent or practically pure organic solvent or solvent mixture and
4. at least one resin serving as thickening or binder for the printing ink; the resin (2) and the resin (4) may be identical.

The term "sublimable dyestuffs" as used herein refers to dyestuffs which display coloristically adequate bleeding (staining) when subjected to the test laid down by the Swiss Standards Institution (SNV) [SNV Standard 95833/1961] "Process for determining the fastness to dry setting and pleating of dyeings and prints (dry heat)". According to SNV Standard 95833/1961, a speciment of coloured material is placed in close contact with uncoloured material for which the dyestuff has good affinity when applied by conventional methods. The composite test sample is then heated for 30 seconds at a given temperature under a pressure of 40 grams ± 10 grams per square centimeter. However, the definition of sublimable dyestuffs as used in this invention also embraces dyestuffs which stain adequately the adjacent uncoloured textile material after a heating time of less than 30 seconds and up to 2 minutes and/or under lower or higher pressure and also without pressure. It is immaterial whether the dyestuff sublimes in the physical sense or penetrates into the textile material in a form other than a gaseous one; the essential factor is that it passes from one substratum to the other. The standard laid down by the American Association of Textile Chemists and Colorists (AATCC 117-1966T) provides a test similar to SNV Standard 95833/1961. The essential factor in both tests is the direct contact between the material containing the dyestuff and the uncoloured material.

It is advantageous to use dyestuffs which sublime within a period of 15 to 25 seconds, at a temperature within the range of from 140° to 300°C, preferably 160° to 220°C.

The term "dyestuffs" as used herein also includes fluorescent brightening agents that display the subliming behaviour as required by the invention.

The dyestuff preparations essential to the manufacture of the printing inks of the invention and which are also included in this invention differ from the usual dyestuff preparations in that the dyestuffs used are suitable for the sublimation or so-called transfer printing process as described in British Patent Specification No. 349,683, whereas the dyestuff preparations that have hitherto been used for the manufacture of printing inks, for example, for printing packaging material or coloured illustrated periodicals, contain highquality inorganic and/or organic colorants which display the highest possible degree of fastness to migration and/or sublimation and which are insoluble in both water and organic solvents. Insoluble and non-subliming colorants of this kind are generally called pigments. In contradistinction thereto, the dyestuff preparations of the invention contain dyestuffs which are preferably more readily soluble, but which, above all, sublime and/or migrate easily.

However, the dyestuffs should be sufficiently fast to migration at temperatures below 120°C to ensure that the prints produced with the printing inks of the invention are stable at room temperature, capable of being stored and are fast to hot pressing.

Accordingly, the invention also includes dyestuff preparations that contain 1. at least one dyestuff or dyestuff mixture that sublimes at 100° to 300°C, preferably at 140° to 220°C, and
2. at least one resin that is soluble in organic solvents and that serves as dyestuff carrier.

Suitable dyestuffs are, in general, the disperse dyestuffs, that is to say, dyestuffs that are preferably insoluble in water and that are capable of dyeing polyester and cellulose ester fibres when applied in the form of an aqueous dispersion, and that can also dye polyamide fibres and, in some cases, acrylonitrile fibres. In the case of polyester and cellulose acetate fibres, it is generally assumed that the dyestuffs dissolve in the fibre material. The disperse dyestuffs belong, for example, to the following chemical classes; anthraquinoid dyestuffs, for example, hydroxy- and/or amino-anthraquinones, azo dyestuffs, quinophthalone dyestuffs, azomethine dyestuffs, stilbene dyestuffs, nitrodiarylamines, and so forth.

The preferred disperse dyestuffs are those melting at a temperature above 140°C. Some dyestuffs of this kind are described in the Journal of the Society of Dyers and Colourists Vol. 70, pages 69–71 (1954) and in Vol. 74, page 389 (1958).

It is also expedient to use dyestuffs having a molecular weight below 1000.

The dyestuffs corresponding to the following formulae are given as examples of suitable dyestuffs:

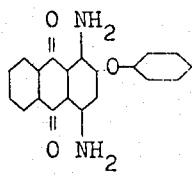 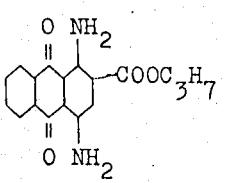 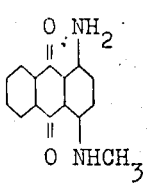

Suitable fluorescent brightening agents are principally monoazole and bisazole derivatives, as well as benzoazole derivatives, for example, fluorescent brightening agents of the formulae

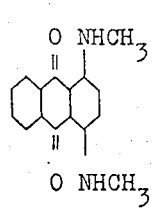 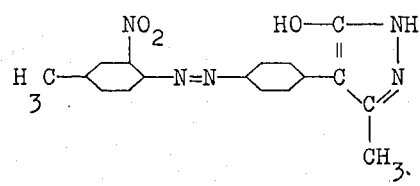

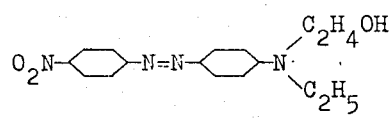 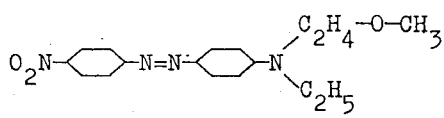

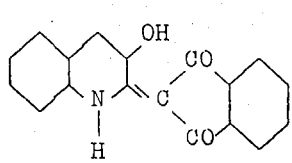 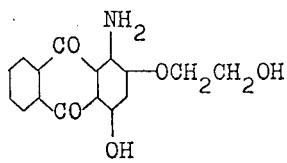

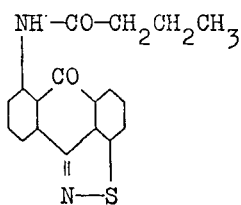 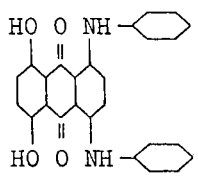

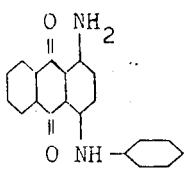 and indigo.

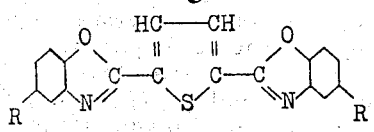

in which R represents a hydrogen atom or an isopropyl, methyl or tertiary butyl group,

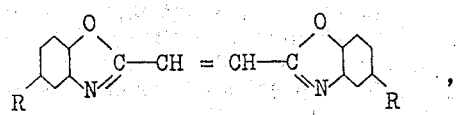

in which R has the meaning given above, and also fluorescent brighteners of the coumarin group, for example, those of the formula

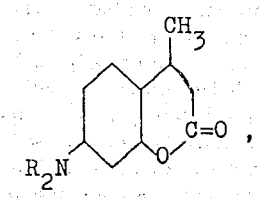

in which R represents a methyl or an ethyl group.

However, fluorescent brightening agents of the stilbene, benzothiophene-S-dioxide, pyrazoline, coumarin or benzimidazole type may also be used, provided they show the sublimation behaviour required in accordance with the invention and have affinity for the materials to be transfer-printed.

Synthetic, semi-synthetic and natural resins may be used as carrier resins in the dyestuff preparations of the invention. The synthetic and semi-synthetic resins may be polymerization, polycondensation or polyaddition products. In principle, all the resins and binders customarily used in lacquer and printing ink manufacture may be used in the manufacture of the dyestuff preparations of the invention; they are listed, for example, in the tables of raw materials for lacquers compiled by Karsten (rd and 4th editions, Hannover, 1963 and 1967, respectively) and/or in the work on synthetic resins for lacquers by Wagner and Sarx, 4th edition, Munich, 1959. The resins used as carriers in the dyestuff preparations are those that do not continue to react chemically in the air or with themselves and possibly undergo cross-linkage. Such resins give so-called "solvent-type" lacquers which do not contain dryeing oils.

The preferred classes of resins are as follows:

a. Colophony, and the derivative thereof in all forms, for example, hydrogenated, dimerized or polymerized, esterified with monohydric or polyhydric alcohols, with resins-formers, for example, acrylic acid and butanediol or maleic acid and pentaerythritol, modified colophony, calcium or zinc salts of colophony, abietic acid and the esters thereof. Soluble phenol resins modified with colophony and resins based on acrylic compounds, and also other natural resins, for example, shellac and other copals, b. terpene resins, c. polyvinyl resins, for example, polyvinylacetate, polyvinyl chloride and polyvinylidene chloride, polyvinylacetals, polyvinyl alcohol, polyvinyl ether, copolymers and graft polymers with different vinyl monomers, polyacrylic acid resins, for example, acrylic acid esters and methacrylic acid esters and the copolymers thereof, d. styrene polymers and copolymers, e. coumarone resins, indene resins and coumarone-indene resins, f. aminoplasts, for example, urea and melamine resins, phenol resins, for example novolaks (non-plasticized resols, resols modified with fatty acids or water-soluble resols); alkylphenol and arylphenol resins, terpenephenol resins, naphthaleneformaldehyde resins, carbamic acid and sulphatoamide resins, furan resins, ketone resins and aldehyde resins.

Also suitable are soluble polycondensation precursors, for example, phenol cresol, urea or melamine formaldehyde resins etherified with higher alcohols, especially butyl alcohol, g. polyamide and polyester resins, for example, linear or branched polyester resins based on phthalic acid, adipic acid, sebacic acid and diols or diol/triol mixture and nylon 6, nylon 66 and isocyanate homopolymers, h. cellulose derivatives of all kinds, for example, cellulose ethers, for example, methyl cellulose, hydroxyalkyl cellulose and alkylhydroxyalkyl cellulose, for example, hydroxyethyl cellulose or hydroxypropyl cellulose, cyanoethyl cellulose, ethyl cellulose and benzyl cellulose in commercial form, and also nitrocellulose, which may also be hyponitrated. The corresponding derivatives of other polysaccharides may also be used, for example, derivatives of starch;

i. unvulcanized caoutchouc and derivatives thereof, for example, cyclocaoutchouc or chlorocaoutchouc and so forth, k. non-cross-linked silicone resins, e. polyurethanes.

The instant "non-drying resins" are those which are non-drying. Such resins form a film only by evaporation of the solvent as defined in the text-book of Henry Fleming Payne, "Organic Coating Technology", New York, 1954, Edited by John Wiley & Sons, Inc, on page 3 as "Method 1 of Film Formation".

The instant "non-drying resins" can be defined as those which, when dissolved in a volatile organic solvent, give coatings which dry by evaporation of the solvent alone, as defined in the text-book of Goldberg, "Polymers and Resins", Princeton, New Jersey, 1959, Edited by Van Nostrand Company, on page 637, first complete paragraph.

The term "non-drying resin" means that, if a solution of a such a resin is used as a lacquer, the coating composition dries by evaporation of solvent, no oxidation, polymerisation or other molecular change taking place. The solution of such resins in volatile organic solvents may be called lacquers, in accordance with the definition of the word "lacquer" used in the "Encyclopedia of Chemistry", 2nd edition, Reinbold Publishing Corporation, New York, 1966, on page 588, first Complete Paragraph.

The ratio between dyestuff and resin may vary within a wide range, but is preferably between 9:1 to 1:4.

Generally the softening point of the resin component is higher than the sublimation temperature of the dyestuff.

Especially preferred resins are cellulose ethers which contain 2 to 4 carbon atoms in the ether residues and which may carry ethyl, propyl, hydroxyethyl and/or hydroxypropyl residues.

The above resins, and especially the cellulose ethers, are chosen because they dissolve readily in organic solvents, such as alcohols, ketons or esters, which may be mixed with aromatic hydrocarbons.

Production of the dyestuff preparations from the sublimable dyestuffs and the above-mentioned resins may be effected by a variety of known methods. For example, they may be made simply by mixing the components in the dry state or in an aqueous medium, by grinding the components together in a sand mill in the wet state or by kneading them together in a kneading apparatus, for example, a sigma-type kneader, whereupon, if desired or required, the products obtained may be converted into a dry form by evaporation, spray-drying, freeze-drying and so forth. Dry dyestuff preparations may also be obtained by adding an organic liquid which is miscible with water and which does not dissolve the resin used to an aqueous suspension of the water-insoluble dyestuff, prepared, for example, by wet grinding and in which the resin is dissolved or dispersed. The resin is thereby precipitated on to the suspended dyestuff, whereupon the product can be isolated by filtration and dried. Another suitable process for the manufacture of marketable dyestuff preparations in paste form based on disperse dyestuffs is described in French Patent Specification No. 1,374,712.

Although the instant dyestuff preparations advantageously do not contain further components, in some cases they may also contain additives, which, however, may also be added at a later stage to the printing inks.

For example, inorganic substances, for example, silica gel, may be added to improve the operating performance of the printing inks.

Other optional additions are the usual dispersing agents for the disperse dyestuffs, namely ionic or nonionic surface-active compounds, for example, the condensation product of β-naphthalenesulphonic acid and formaldehyde, partially desulphonated lignin sulphonate or the condensation product of 1 mol of octylphenol and 8 mols to 10 mols of ethylene oxide.

Further optional components which may be present in the dyestuff preparation or the printing ink are plasticizers, for example, dibutyl phthalate, swelling agents for the fibre to be dyed, penetrating agents and carriers; liquid additives are preferably added during preparation of the printing inks when the dyestuff preparations are required to have a dry consistency.

The present invention also provides a process for the manufacture of the printing inks, wherein the components which consist of 1. a dyestuff or dyestuff mixture which sublimes at 100° to 300°C, preferably at 140° to 230°C, which may contain a component 2. a soluble resin or resin mixture which serves as dyestuff carrier, are mixed with 3. an aqueous organic or practically pure organic solvent or mixture of solvents and 4. a resin or resin mixture which serves as thickening agent and/or binder, and wherein the components (2) and (4) may be mixed previously and the components (2) and (3) may be, at least in part, identical.

Mixing may be carried out in known manner: for example, the printing ink may be prepared from the very finely dispersed components (1) and (2) and the components (3) and (4) like a pigment dispersion, if necessary, by kneading in the presence of grinding media according to the process described in French Patent Specification No. 1,079,477 (Case 2997).

Other mixing processes and types of apparatus are mentioned above in respect of the preparation of the dyestuff preparations; however, in all cases the pure water is replaced by an aqueous organic or purely organic phase.

Practically all organic solvents that boil at a temperature below 220°C, preferably below 150°C, under atmospheric pressure and which display an adequate degree of solubilizing or emulsifying (dispersing) power in respect of the dyestuffs used may be employed in the preparation of printing inks from the dyestuff preparations. The following are given as examples of organic solvents that may be used: aliphatic and aromatic hydrocarbons, for example, n-heptane and benzene, xylene or toluene; halogenated hydrocarbons, for example, methylene chloride, trichloroethylene or chlorobenzene; nitrated aliphatic hydrocarbons, for example, nitropropanes; aliphatic amides, for example, dimethylformamide or mixtures thereof; glycols, for example, ethylene glycol or polyethylene glycols, the monoalkyl and dialkyl ethers thereof, ethylene glycol monoethyl ether, ethylene glycol diethyl ether, diethylcarbonate, dimethylcarbonate, or esters, for example, ethyl acetate, propyl acetate, butyl acetate, β-ethoxyethyl acetate; aliphatic or cycloaliphatic ketones, for example, methylethyl ketone, methylisobutylketone, cyclohexanone, isophorone, mesityl oxide or diacetone alcohol. It may also be advantageous to use a mixture of an aliphatic ketone, for example, methylethyl ketone, and an aromatic hydrocarbon, for example, toluene. It is specially advantageous to use alcohols, for example, methanol, ethanol, and preferably n-propanol, iso-propanol, n-butanol, tertiary butanol, sec. butanol or benzyl alcohol; also suitable are mixtures of several solvents which contain at least one solvent belonging to the classes mentioned above, or aqueous solvent mixtures.

In addition to the dyestuffs or fluorescent brighteners and solvents (diluents), the printing inks to be used in accordance with the invention preferably also contain at least one binder, which acts as a thickening agent for the ink and at least as a temporary binder to fix the dyestuff on the material to be printed. Substances suitable for use as binders of the kind described are synthetic, semisynthetic and natural resins, including polymerization, polycondensation and polyaddition products. In principle, all the resins and binders customarily used in the manufacture of lacqueous and printing inks can be used; these are described, for example, in the above-mentioned tables of raw materials for lacquers compiled by Karsten (4th edition, Hannover 1967) and in the work on synthetic resins for lacquers by Wagner and Sarx (4th edition, Munich 1959). The preferred substances are physically drying resins, that is to say, resins that do not react chemically in the air or with themselves (or undergo cross-linking), but which produce a dry film when the solvent is removed. It is advantageous to use resins that are soluble in the solvents used.

The resins may be identical with the resins mentioned above as being suitable for use in the production of the dyestuff preparations; in this case it may be quite unnecessary to add further resin as binder when preparing the printing inks.

However, other resins may also be used in the preparation of the printing inks, which resins are preferably compatible with the resins used as dyestuff carriers.

Specially preferred binders and/or thickeners are as follows: cellulose derivatives, for example, nitrate cellulose, cyanoethyl cellulose, ethyl cellulose and methyl cellulose, hydroxyalkylate cellulose, for example, hydroxyethyl cellulose and hydroxypropyl cellulose, or cellulose esters, for example, cellulose acetate, cellulose triacetate or cellulose 2½-acetate, or mixed esters with other fatty acids.

The composition of the printing ink in respect of the amounts of resin mixture and solvent mixture used, for example, when printing paper, is determined by two requirements:

Firstly, solvent must be present in an amount sufficient to ensure that the resin remains dissolved and/or dispersed and, secondly, the amount of solvent present must be within those limits which ensure that the printing ink has the correct degree of viscosity for the printing process. For example, good results are generally obtained in intaglio printing when the quantitative ratio of resin to solvent is between 1:1 and 1:50, preferably between 1:3 and 1:20.

In accordance with the invention, printing inks are preferred which contain not only pure hydrocarbons as solvent components. Thus, the resins present in printing inks of this kind must also be soluble in the appropriate solvents, especially ketones, esters and alcohols which preferably boil at temperatures below 100°C. Printing inks of this kind have the advantage that the solvent can be removed after printing at comparatively low temperatures.

The printing technique and the composition of the printing inks are adapted in the usual manner to suit the substratum. For example, alcoholic or aqueous alcoholic printing inks are used for intaglio printing, flexographic printing or screen printing, as used, for example, in the printing of paper, and resins which are soluble in alcohols or water/alcohol mixtures are used as thickeners and/or binders.

A very wide variety of materials may serve as substrata for the printing pastes of the invention, anmely, different kinds of paper, for example, paper containing wood pulp and paper without pulp, machineglazed paper, millfinished paper, satined paper, lightly sized, absorbent paper, coated paper, grease-proof and water-proof paper, newsprint containing mechanical wood pulp, cardboard, and so forth, plastic films made from polypropylene, polyvinyl chloride, cellophane, coated and lacquered cellophane, textiles, for example, cotton fabrics, fabrics made from regenerated cellulose staple fibre, polypropylene fabrics and also metal foils and sheet metal, especially aluminium foils and other metal foils.

The following Example illustrates the invention. Unless otherwise stated, the parts and percentages are by weight.

EXAMPLE 1

20 Parts of the yellow disperse dyestuff of the formula

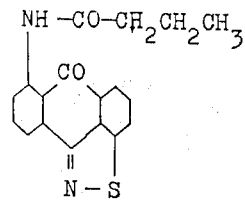

20 parts of hydroxypropyl cellulose (trade-name: Klucel J; Hercules) and 360 parts of water are ground together for 24 hours in a laboratory-type sand mill, while cooling. The ground material is then freed from water in a spray dryer. A loose, yellow powder is obtained.

The dyestuffs of the following formulae

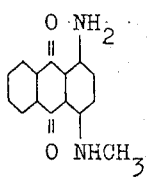 and 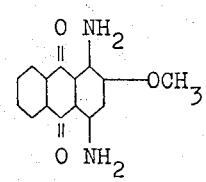

are processed in a similar manner into blue and violet powders respectively.

EXAMPLE 2

In a kneader, 1 part of one of the dyestuffs appearing in the Table below, 1 part of ethyl cellulose (Ethocel E 7, DOW CHEMICAL), 4 parts of ground sodium chloride and 0.9 part of diacetone alcohol are kneaded for 4 hours at 50°C. The mass is granulated by the addition of 1 part of water, then subjected to a wet grinding operation with the use of 75 parts of water. The resulting suspension is filtered, liberated from solvent and salt by washing with water, and the resulting filter cake is dried in a vacuum cabinet. A free-flowing powder is obtained.

The dyestuff preparations obtained as described above are used for making printing inks as follows:

2.5 parts of dyestuff preparation, 2.5 parts of ethyl cellulose (Ethocel E 7, DOW CHEMICAL) and 10 parts of isopropanol are stirred until all of the resin is dissolved, and until the dyestuff is either dissolved or homogenously distributed.

In an analogous manner, printing inks are obtained when the 10 parts of isopropanol are replaced by 10 parts of methyl ethyl ketone.

| Dyestuff | shade of printing ink |
|---|---|
| 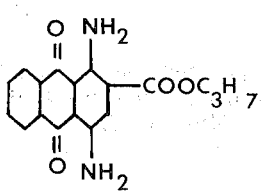 | blue |

| Dyestuff | shade of printing ink |
|---|---|
| 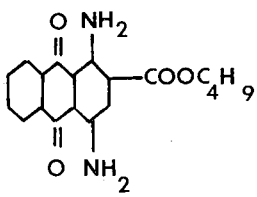 | blue |
| 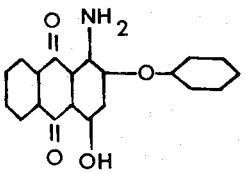 | red |
| 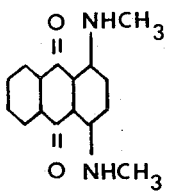 | blue |
| 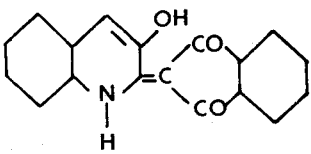 | yellow |
| 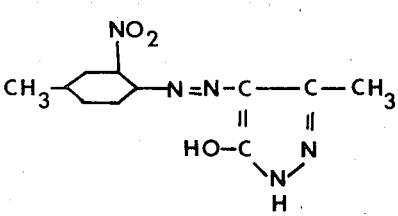 | yellow |

EXAMPLE 3

39 parts of the yellow dispersion dyestuff of the formula

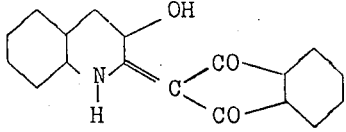

39 parts of a pentaerythritol ester of dimerised rosin (colophony commercially available under the trade name "Pentalyn K" from the Hercules Powder Company, USA), 156 parts ground sodium chloride and 35 parts w,w'-diethoxydiethyl ether were knead for 4 hours with cooling (at 20°C) in a commercial kneader. By addition of 200 parts ice the mass is separated in an aqueous and an organic resinous phase. The latter is worked up as described in Example 2 to give a solid non-drying resin containing 50% dyestuff.

EXAMPLE 4

36 parts of the above-mentioned (Example 3) yellow dyestuff, 36 parts poly-β-terpene resin (commercially available under the trade name "Escorez 4110" from the Esso Company)

180 parts ground sodium chloride and 20 parts w,w'-diethoxydiethyl ether were kneade for 4 hours with cooling at 20°C. By addition of 50 parts ice and 12 parts isopropanol the mass was separated in an aqueous and an organic resinous phase which was granulated and worked up as in Example 2. A solid, non-drying resin preparation containing 50% dyestuff was obtained.

EXAMPLE 5

30 parts of the blue dispersion dyestuff of the formula

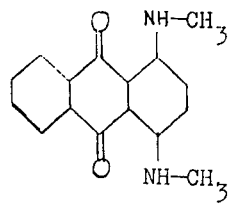

30 parts poly(vinyl acetate) (sold commercially under the name "Vinnapas B 500, by Messrs. Wacker-Chemie, Munich, Germany) 120 parts ground sodium chloride and 20 parts diacetone alcohol were kneaded 4 hours at 50°–60°C in a kneader. By addition of water, the salt was partially extracted. After removal of the salt solution, another portion of 100 parts water was added and kneading was continued to remove the residual salt. After separation of the water the mass was granulated and worked as described in Example 2. A resinous non-drying resin preparation was obtained which contained 50% of the blue dyestuff.

EXAMPLE 6

37.5 parts of the yellow dye mentioned in Example 3, 56.2 parts polystyrene resin (commercially available under the trade name "Afcolene A" from Products Chimiques Pechiney-Saint Gobain, France).

150 parts ground sodium chloride and 35 parts γ-butyrolactone were kneaded for 4 hours with cooling at 20°C in a commercial kneader. By addition of 100 parts water the mixture was separated and the organic resin phase was granulated and worked up as in Example 2 to give a non-drying resin composition containing 40% dyestuff.

EXAMPLE 7

40 parts of the yellow dyestuff of Example 3, 60 parts of a cumarone-indene resin (sold commercially under the trade name "Necires BF 125", by Neville Cindu Chemicals, Netherlands) 160 parts ground sodium chloride, and 25 parts w,w'-diethoxy diethyl ether were kneaded for 4 hours with cooling at 20°C in a commercial kneading machine. By addition of 200 parts ice the kneading mass the mixture was separated and granulated and worked as in Example 2. A yellow resin composition containing 40% dyestuff was obtained.

EXAMPLE 8

32 parts of the red dispersion dye of the formula

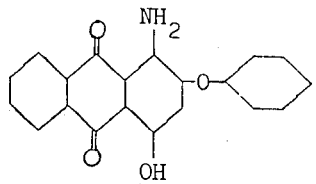

64 parts of a phenolic resin of the novolak type (commercially sold under the trade name "Alnovol 429K", Chemical Works Albert, Wiesbaden, Germany), 160 parts ground sodium chloride, and 30 parts diacetone alcohol were kneaded for 6 hours at 30°C in a kneader, and then separated by addition of 100 parts ice. The solid resin was granulated and then worked up as in Example 2. A red, non-drying resin composition is obtained which contained 33% dyestuff.

EXAMPLE 9

37 parts of the yellow dye of Example 3, 55, 5 parts of chlorinated rubber (commercially sold under the name of "Parlon S 5", by Farbenfabriken Bayer, Germany) 148 parts ground sodium chloride, and 40 parts γ-butyrolactone are kneaded 4 hours with cooling at 20°C in a commercial kneader. The mass is separated by addition of 50 parts water and the organic resin is granulated and worked up as in Example 2 to give a yellow, non-drying resin composition containing 40% dyestuff.

EXAMPLE 10

38 parts of the red dyestuff of Example 8, 38 parts of a silicone resin containing methoxy functions (commercially sold under the trade name "Silikone resin H 19," Wacker Chemical Works, Munich, Germany) 152 parts ground sodium chloride and 15 parts diacetone alcohol were kneaded for 6 hours at about 50°C in a commercial kneader. The mass separates upon addition of 100 parts water. The resin is then granulated and worked up as in Example 2. A red, non-drying resin composition was obtained which contained 50% dyestuff.

I claim:
1. An intaglio printing ink which contains:
  1. the dyestuff of formula

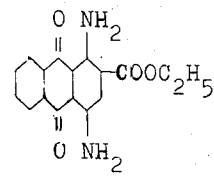

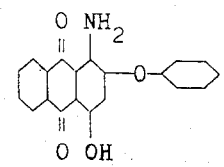

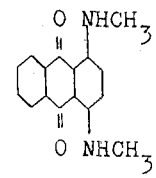

or

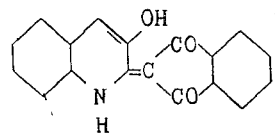

2. an aqueous-organic or substantially pure organic solvent or mixture thereof; and
  3. at least one resinous cellulose derivative which dissolves readily in (2), and which serves as binder or thickener for the printing ink.

2. A printing ink as claimed in claim 1 containing as component (2) an aliphatic or cycloaliphatic ester, ketone or alcohol containing at the most 6 carbon atoms.

3. A printing ink as claimed to claim 1, wherein the resin components (2) and (4) are identical.

4. A printing ink as claimed in claim 1, wherein the resin is a cellulose ether.

5. A printing ink as claimed in claim 4, wherein the resin is ethylcellulose.

6. A printing ink as claimed in claim 1, and the dyestuff has the formula

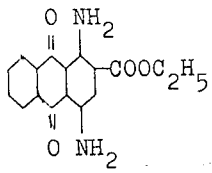

7. A printing ink as claimed in claim 1, wherein the dyestuff has the formula

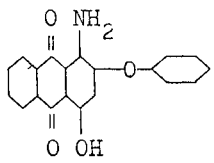

8. A printing ink as claimed in claim 1, wherein the dyestuff has the formula

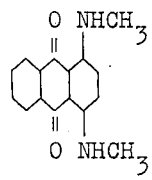

9. A printing ink as claimed in claim 1, wherein the dyestuff has the formula

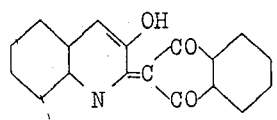

10. A printing ink as claimed in claim 1 employing as component (2) isopropanol or methylethylketone.

* * * * *